United States Patent [19]
Tang

[11] Patent Number: 5,942,077
[45] Date of Patent: Aug. 24, 1999

[54] LAMINATING APPARATUS

[75] Inventor: Luen Sing Tang, Yuen Long, The Hong Kong Special Administrative Region of the People's Republic of China

[73] Assignee: Tecksom International Ltd., Nassau, Bahamas

[21] Appl. No.: 08/803,999

[22] Filed: Feb. 21, 1997

[30] Foreign Application Priority Data

Oct. 14, 1996 [GB] United Kingdom .................. 9621385

[51] Int. Cl.⁶ .................................................. B32B 31/00
[52] U.S. Cl. .......................... 156/361; 156/298; 156/544; 156/554; 428/201; 226/19
[58] Field of Search .............................. 156/64, 324, 361, 156/362, 363, 544, 552, 554, 297, 298, 300; 226/18, 19, 20; 428/53, 201, 202, 203

[56] References Cited

U.S. PATENT DOCUMENTS

| | | | |
|---|---|---|---|
| 2,828,435 | 3/1958 | Hoyt .................................... | 156/300 X |
| 2,894,292 | 7/1959 | Gramelspacher ......................... | 52/474 |
| 3,900,360 | 8/1975 | Leatherman .......................... | 156/272.4 |
| 4,485,982 | 12/1984 | St. John et al. ...................... | 226/15 X |
| 4,837,072 | 6/1989 | Kraetschmer ........................... | 428/201 |
| 4,888,717 | 12/1989 | Ditto et al. .............................. | 364/559 |
| 4,978,401 | 12/1990 | Bonomi ...................................... | 156/64 |
| 5,098,507 | 3/1992 | Mao ........................................ | 156/351 |
| 5,460,672 | 10/1995 | Mallonee ............................ | 156/544 X |
| 5,587,037 | 12/1996 | Fellner ................................ | 156/300 X |

*Primary Examiner*—James Engel
*Attorney, Agent, or Firm*—Birch, Stewart, Kolasch & Birch, LLP

[57] ABSTRACT

An apparatus for producing laminated materials is provided, having a first supply roller, a system comprising a second and a third supply roller, and an electronic sensor which tracks lateral movement of a control line in material leaving the first supply roller, wherein the lateral positioning of said system is adjusted in response to said lateral movement such that the lateral alignment of the second and third supply rollers remains constant with respect to said material. By maintaining constant lateral alignment, it is possible to manufacture laminated materials comprising a layer made from strips of material which abut but which do not overlap.

14 Claims, 2 Drawing Sheets

LAMINATING APPARATUS

BACKGROUND OF THE INVENTION

This invention relates to apparatus and methods for producing laminated materials, for example such as are used in packaging.

Goods such as processed food, sweets, medication and liquids are often packaged in material which isolates them from water, gas, vapor, oil, chemicals and the like. This packaging material is usually decorated in order to distinguish the product from similar goods, for instance, or to provide directions for use, to list ingredients or to provide statutory information.

Typical material for this purpose is made from single or double layered transparent plastics over-printed with the desired design, with double layered materials offering better protection to goods.

In order to enhance the visual appeal of a package or to provide a degree of protection against counterfeiting it may also be desirable to add metallised effects, such as holograms, within such multi-layered material. The resulting laminated packaging material typically comprises a sheet of aluminium foil or holographic film sandwiched, and thus protected, between two sheets of transparent polyethylene or polypropylene, one or both of which could be over-printed with a design. This material is not transparent, however, due to the presence of the opaque metallised layer.

It would be desirable to have available a packaging material which includes a metallised layer but through which the contents of a package are visible. This can be achieved by sandwiching strips of metallised material, rather than whole sheets, between outer transparent layers. In the regions where the metallised layer is absent the material is thus transparent.

However, simply laminating strips of foil within two plastic layers is not feasible on a mass production basis. The final laminated material will not be of uniform thickness and this will be magnified when it is rolled up, for instance. It is therefore necessary for the middle layer to include strips of transparent material parallel and adjacent to the metallised material to provide a layer with as constant a thickness as possible.

A desirable laminated material will thus be of substantially uniform thickness, having five layers ie.:

(A) a transparent film made from a material such as polypropylene or polyethylene, probably decorated with a design;

(B) an adhesive layer;

(C) a layer consisting of a combination of parallel strips of different materials in the same plane or surface. These strips might be, for instance, lightline aluminium metallised or partially-metallised laminating foil, metallised polypropylene film, aluminium foil, or transparent polypropylene or polyethylene;

(D) a further adhesive layer; and (E) a heat-sealable or heat-melting film allowing easy application for an automatic packaging system.

Laminated packaging materials are generally manufactured according to the following process. The materials which make up layers (A) and (C) are loaded onto separate supply rollers. Material (A) proceeds from its supply roller through a glue tank, where an adhesive layer (B) is applied to its back surface, and then through a drying tunnel. The strips which form layer (C) issue from the relevant supply rollers and meet material (A) emerging from the drying tunnel (A) at an assembly roller. Layer (C) is bonded to adhesive layer (B) to form a laminated material (AC) which is collected on a receiving roller.

To complete the packaging material, the laminate (AC) is removed from the receiving roller and re-loaded onto a supply roller. The process is repeated on material (AC), with adhesive being applied to layer (C) and heat-sealable film (E) being attached to form finshed product (ACE) laminate.

A significant problem when manufacturing laminated material in this way, however, is the alignment of the strips in layer (C). The strips, which might be of differing widths, will generally issue from separate supply rollers which might have drums of different diameters and different motor speeds. The different materials will tend to have different tensile strengths, different coefficients of friction, and different thicknesses.

During bonding at the assembly roller, aligning the strips in parallel on the same plane or surface without an overlap is a problem. Avoiding wrinkles, creases, breakage, and deformation of strips during lamination is also difficult. These problems, of course, cause wastage of materials and interruption of the production line. Furthermore, the alignment of the layers at the assembly roller is liable to change due, for instance, to vibration of the machine and for these reasons current machines and processes of manufacture are, in general, limited to just two strips.

There is thus a need for a laminating process in which the strips which make up layer (C) can be accurately aligned relative to layer (A).

SUMMARY OF THE INVENTION

According to the present invention there is provided an apparatus for producing laminated materials having a first supply roller, a system comprising a second and a third supply roller, and an electronic sensor which tracks the lateral movement of a control line in material leaving the first supply roller, wherein the lateral positioning of said system is adjusted in response to said lateral movement such that the lateral alignment of the second and third supply rollers remains constant with respect to said material.

The control line can be any feature whose lateral movement can be tracked by an electronic sensor. The control line is preferably a visible coloured line but might be, for instance, a thin magnetic strip. Preferably such control lines have a width of 0.5 mm to 3.0 mm. Such control lines need not be continuous, but they must be electronically readable. Alternatively, the control line can be the edge of the material leaving the first supply roller.

The electronic sensor can be any sensor which is capable of accurately tracking the lateral movement of a control line. Preferably the electronic sensor can track various types of control line. Suitable sensors are well known in the art for line and edge detection and these typically comprise a tungsten lamp and a CdS light detector which picks out very small changes in resistance as the control line meanders. Depending on the reflection efficiency, different filters can be used with the detector. For instance, where reflection is efficient a ground glass filter might be used.

Preferably the electronic sensor is fixed to the system comprising the second and third supply rollers such that the system and sensor move in concert.

Preferably the lateral positions of the second and third supply rollers are independently adjustable within the system although during operation of the apparatus the lateral positions should remain fixed relative to each other.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE FIGURES

A specific embodiment of the invention will now be described by way of example with reference to the accompanying drawings which are given by way of illustration only, and thus are not limitative of the present invention, and in which.

DESCRIPTION OF THE PREFERRED EMBODIMENTS

Figure 1:
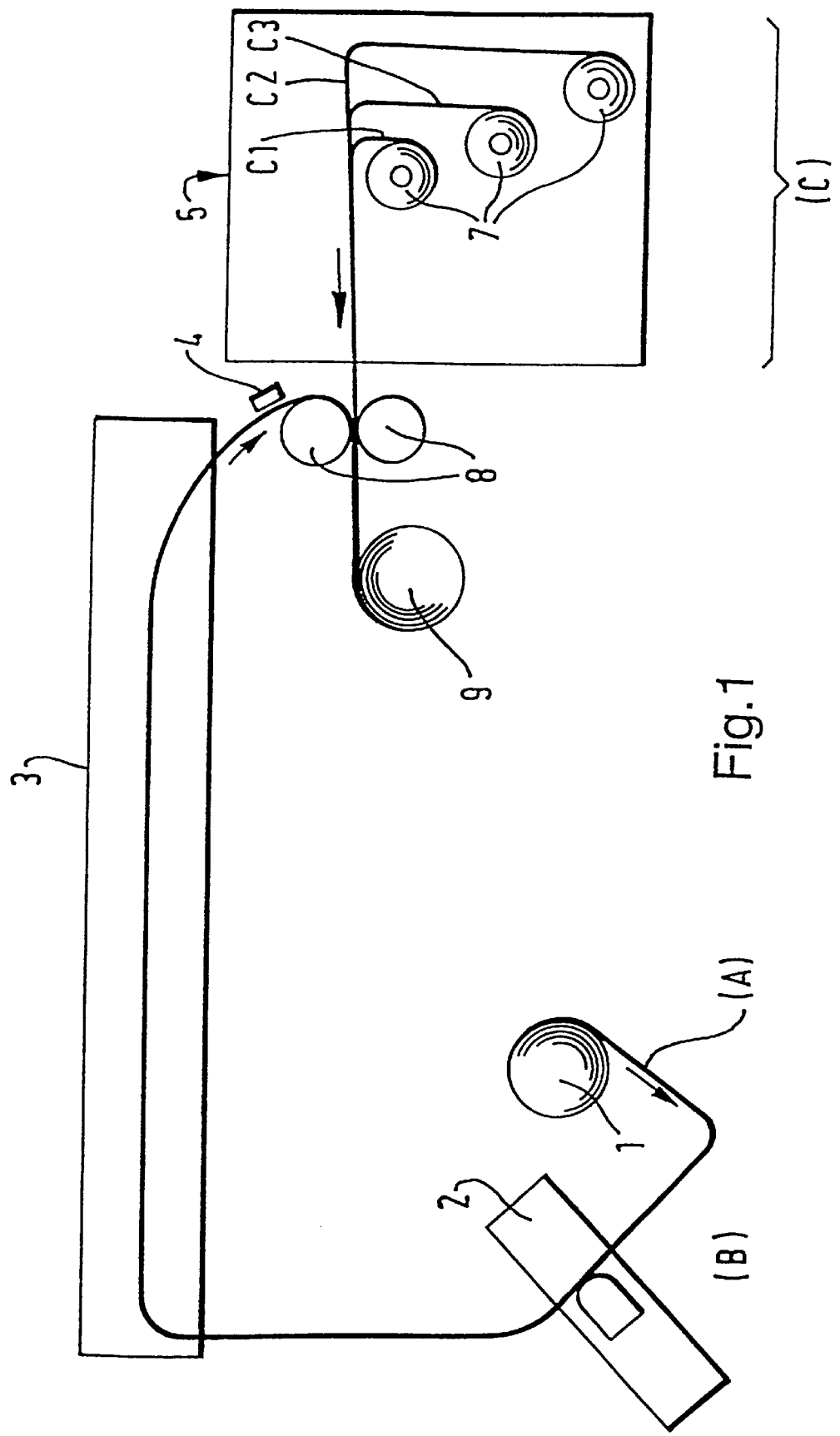
FIG. 1 illustrates the apparatus and FIG. 2 shows the materials being laminated at the assembly roller (8).

The apparatus in FIG. 1 is for bonding two layers (A) and (C) to form a laminated material. Layer (A) might, for example, be a transparent film made from polyethylene, over-printed with a design. Layer (C) is formed from a series of adjacent parallel strips ($C_1$, $C_2$, $C_3$, . . . ) which abut and do not overlap. The strips might, for instance, be a wide transparent strip abutting with a thin metallised holographic strip abutting with a wide translucent strip.

Transparent film (A) is loaded onto supply roller (1) and its tension is adjusted. Similarly, the ($C_1$, $C_2$, $C_3$, . . . ) which form layer (C) are loaded onto supply rollers (7) which are mounted in system (5). The tensions of the supply rollers (7) are adjusted and the rollers (7) are laterally arranged such that the edges of the strips leaving the rollers (7) which make up layer (C) will abut.

During operation film (A) proceeds through the glue tank (2), where adhesive layer (B) is applied to its back surface, and then into drying tunnel (3).

Film (A) with adhesive layer (B) emerges from the drying tunnel (3) and reaches a point where electronic sensor (4) is situated. Film (A) contains a control line (X) which is still electronically readable through the dried adhesive layer (B). Electronic sensor (4) is intitially positioned so that control line (X) will be within its range of detection when film (A) passes beneath.

In the course of the laminating process, small lateral changes in the travel path of film (A) occur. The electronic sensor (4) detects these changes by tracking the position of the control line (X) in film (A) and transmits details of these changes to system (5) which comprises a supporting frame (6) on which a plurality of supply rollers (7) are mounted and secured. Each roller (7) is independently laterally adjustable vis-a-vis the other rollers (7) but during operation the rollers (7) are fixed relative to each other. Each roller (7) possesses its own speed reducer motor and tension detector.

In response to the signals from sensor (4), the lateral position of system (5) is adjusted. Rollers (7) thus move together relative to assembly roller (8) and the alignment of material (A) and the materials from rollers (7), which make up layer (C), remains constant.

Figure 2:
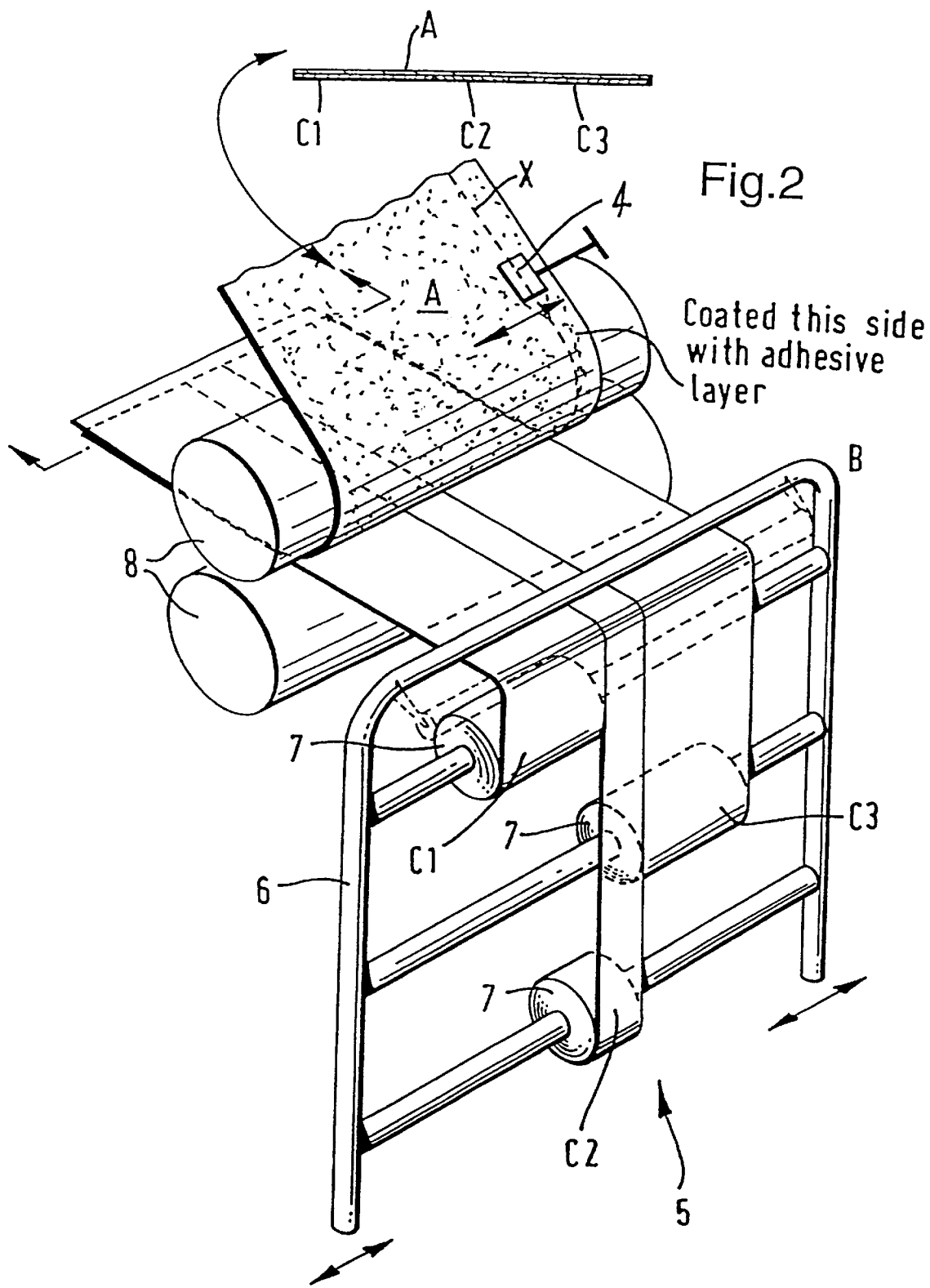

As shown in FIG. 2, the strips ($C_1$, $C_2$, $C_3$, . . . ) forming layer (C) emerge from system (5) precisely aligned with film (A). At heated assembly roller (8) layer (A) meets the strips which form layer (C). The strips are bonded to adhesive layer (B) to form a laminated material (AC) which is collected on receiving roller (9).

To complete the packaging material, the laminate (AC) is removed from receiving roller (9) and re-loaded onto supply roller (1). After due adjustment of tension, the process is repeated on material (AC), with adhesive being applied to layer (C) and heat-sealable film (E) being attached to form finshed product (ACE) laminate.

The laminate (ACE) is left at an appropriate temperature for about 12 to 48 hours to let the layers settle before being used for packaging.

It will be understood that the invention is described above by way of example only and modifications may be made within the scope and spirit of the invention.

I claim:

1. An apparatus for producing laminated materials comprising:
    a first supply roller for feeding a first material;
    a second supply roller and a third supply roller for feeding second and third materials, respectively;
    a supporting frame for supporting said second and said third supply rollers, said supporting frame being mounted for lateral movement; and
    an electronic sensor for detecting lateral movement of a control line in said first material leaving the first supply roller;
    wherein a lateral position of said supporting frame is adjustable in response to said lateral movement detected by said sensor to adjust a lateral position of the second and third materials.

2. The apparatus according to claim 1, wherein said control line is a visible continuous colored line spaced from an edge of the first material.

3. The apparatus according to claim 1, wherein said control line is an edge of the first material.

4. The apparatus according to claim 1, wherein the lateral position of the second and third supply rollers is independently adjustable on said supporting frame.

5. The apparatus according to claim 1, further comprising a glue tank for applying an adhesive layer to the back surface of the first material.

6. The apparatus according to claim 1, wherein the supply rollers are arranged to feed the first material in face to face relationship with the second and third materials, the second and third materials each having one edge in abutting relationship with each other and a second edge in lateral alignment with the first material.

7. The apparatus according to claim 1, wherein said first supply roller is supported at a spaced location from said supporting frame.

8. A method for producing a laminated material comprising the steps of:
    supplying a first material containing a control line from a first supply roller;
    supplying a second material and a third material from second and third supply rollers, respectively;
    supporting the second and third supply rollers on a supporting frame;
    detecting lateral movement of said control line by means of an electronic sensor; and
    adjusting a lateral position of said supporting frame in response to said lateral movement detected by said sensor to adjust a lateral position of the second and third materials.

9. The method according to claim 8 further including the steps of:
    feeding the first material in face to face relationship with a first side of the second and third materials; and
    feeding the second and third materials in edge abutting relationship with each other.

10. The method according to claim 9 further including the steps of:
   laminating the first material to the first side of the second and third materials; and
   laminating a fourth material to a second side of the second and third materials.

11. The laminated material obtainable by the process according to claim 8.

12. A method of adjusting a lateral position of a second and a third supply roller relative to material leaving a first supply roller including the steps of:
   providing a continuous control line in the first material, spaced from an edge thereof;
   detecting lateral movement of said control line with an electronic sensor; and
   laterally adjusting the second and third rollers together as a unit in response to the lateral movement detected by the sensor.

13. A laminated material comprising first, second, third, and fourth layers of material, the second and third layers being sandwiched between the first and fourth layers, each of said second and third layers of material having an edge in abutting relationship with each other, said first and fourth layers are transparent film and at least one of said second and third layers is a metallized holographic strip.

14. The laminated material according to claim 13, wherein a fifth layer of material is sandwiched between said first and said fourth layers of material, said fifth layer of material has an edge in abutting relationship with one of said second and third layers of material, and wherein said second layer of material is a wide transparent strip, said third layer of material is a thin metallized holographic strip, and said fifth layer of material is a wide translucent strip.

* * * * *